Oct. 23, 1934.                H. POLECK                 1,978,224
                          LINE PROTECTING DEVICE
                           Filed July 24, 1929
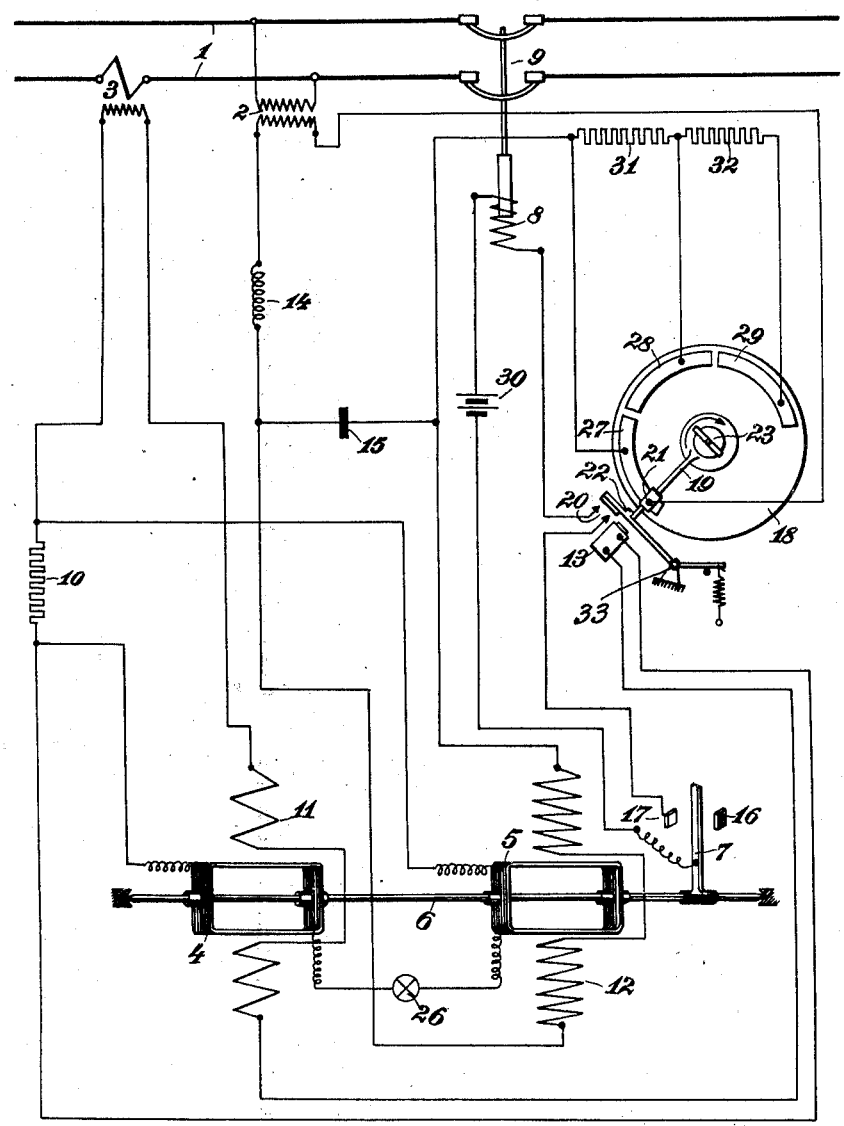
Inventor:
Hans Poleck
by
Lorra, Kehlenbeck & Farley
Attorneys.

Patented Oct. 23, 1934

1,978,224

UNITED STATES PATENT OFFICE 1,978,224

LINE PROTECTING DEVICE

Hans Poleck, Berlin-Lichterfelde, Germany, assignor to Siemens & Halske Aktiengesellschaft, Siemensstadt, near Berlin, Germany, a corporation of Germany Application July 24, 1929, Serial No. 380,553
In Germany July 27, 1928

27 Claims. (Cl. 175—294)

This invention relates to improvements in a device for cutting out faulty line sections in which a force dependent on the current and a force dependent on the voltage act in opposite senses on a releasing member.

For the protection of electric energy transmission lines, the use of relays is already known, in which current and voltage exert opposing forces on a common movable release member. As long as the line is in the proper working condition, the force due to the voltage preponderates, but when, on the contrary, a short-circuit takes place, the voltage force is weakened to a greater or smaller extent according to the distance from the short-circuit while the current assumes an abnormal value. The current moment then outweighs the moment due to the voltage, and consequently the release contact of the relay is closed. In order to obtain a graduation of the releasing period of several relays connected in a circuit, it has furthermore already been proposed to add to each relay an excess current response relay by means of which auxiliary devices are started in all relays at the moment when an excess current is produced, which devices uniformly increase the influence of the current with respect to that of the potential. At such line protecting relay as is nearest to the fault, for which consequently the voltage is smallest, the force due to the current will first outweigh that of the voltage; this relay therefore first releases its line switch. The releasing time of these known relays is dependent on the impedance of the line, which impedance as is known, is dependent on the contact resistance at the point of the fault. Furthermore such line protecting relays lack in direction-sensitiveness, which is of great importance for a selective safety device.

In the following, a description will be given of a new direction-sensitive safety device in which a force dependent on current and another dependent on current and voltage act in opposite directions on a release member, this release member remaining at rest as long as the force dependent on current and voltage preponderates, but carrying out its release movement as soon as the force dependent on the current alone gains the ascendancy.

This always takes place in case of a short circuit occurring at a certain distance from the relay position. The force dependent on the voltage can be weakened, for instance, by connecting a resistance in series with a coil energized by the potential or by means of shunts in parallel therewith; and inversely the force due to the current can also be increased. Both measures permit of varying the range of protection of the device. The device only responds to a fault produced within its protective range. When several such relays are distributed over a line section, it is advisable to take care that, on the failure of the associated relay, the relays of the two successive sections are ready to cut out the faulty line. With increasing number of line sections lying between a relay and the point where the fault occurs, the releasing period of the relays is graduated, so as to cause the one nearest to the fault to respond and then the next in order if said nearest relay should fail, or the third relay if said second relay should fail, it being understood that such third relay will become operative only in cases where the fault in the line has not been remedied before the releasing period of said third relay has been terminated. This can easily be realized with the new relay in the manner described above. A contact device cooperates, for instance, with the relay and, from the moment when an excess current is produced in the protected line, weakens the field of the voltage coil viz. by gradually increasing a resistance in series with the voltage coil, so that even in the relay most distant from the fault location, after a certain lapse of time, the force due to the current overcomes that of the potential and, consequently, the relay closes its release contact.

In order to avoid that the time before a distant relay responds be too long it is advisable to effect the weakening of the voltage force field or the strengthening of the current force by degrees in such a manner that the relay, on the occurrence of a fault on the line section in which it is connected, is cut out within a second and, in case of a fault on the adjacent section, within two seconds, should the first relay have failed, and with a fault occurring beyond the adjacent section, within three seconds, should all the relays nearer to the fault have failed. The new relay will now be described in connection with an example of construction and use:

In the drawing, the line to be protected is indicated by 1. The potential of the line is measured through a potential transformer 2, and the current in the line through a current transformer 3.

The relay has two preferably series connected movable coils 4 and 5, which are mounted on a common spindle 6. The spindle 6 carries a contact arm or circuit closer 7; through the contact arm 7 and a contact 17, the circuit for the release coil 8 of the line switch or interrupter 9 can be closed. The movable coils 4 and 5 of the relay are energized by the line current. For this purpose, an ohmic resistance 10 is connected in the secondary circuit of the current transformer 3, the potential for the energizing of the coils 4 and 5 being supplied by leads tapped on said circuit at the terminals of said resistance. The coils 4 and 5 move in the field of two fixed pairs of coils 11 and 12. The fixed coils 11 are also energized by the line current 1, the fixed coils 12, on the contrary, through the potential transformer 2, corresponding to the potential existing on the line. The direction of winding of the pairs of coils 4 and 11, and of 5 and 12 respectively is such that the torques created by the pairs of coils are opposite in direction. The force exerted by the coils 4 and 11 depends on current alone, while the force exerted by the coils 5 and 12 depends both on current and on voltage. The secondary circuit of the current transformer 3 also contains the coil of an excess current magnet 13, the object of which will be more fully described later. A metal filament lamp 26 is connected in series with the movable coils 4 and 5 and protects these coils from overloading.

The voltage circuit contains, as already mentioned, the fixed coils 12. An artificial circuit consisting of a choking coil 14 and a capacity 15 has for its object to create in the coils 12 a field displaced by 90° with respect to the line voltage. Thus, the torque produced in the coil system 5, 12 is proportional to the wattless components of the voltage, so that the relay responds when the reactance of the protected line circuit exceeds a certain lower limit. An artificial circuit can be dispensed with, if the relay is to supervise the ohmic resistance of the line, or if a direct current line is to be protected; in this case, the current and potential transformers which can only be used in alternating current circuits are replaced by corresponding resistance circuits. As long as the line resistance is high and therefore the force dependent on the voltage sufficiently large, the contact arm 7 rests against a stop 16, but when the relay responds, said arm engages its counter contact 17.

The protective device is provided, furthermore, with a contact contrivance 18, which has, for instance, a contact arm 19, driven by a clockwork, and a contact 21. As long as there is no excess current on the line 1, the contact arm 19 is in the normal position shown in which it is held by a pawl 22. On the occurrence of an excess current, the overload magnet 13 is energized and draws back the pawl 22 carried by its armature 33. The contact arm 19 is therefore liberated to move, and, at contacts 20, the said armature 33 prepares the circuit for the release coil 8 of the line switch 9. The contact arm 19 may be driven by a clockwork 23.

The contact 21 of the contact arm 19 slides in its rotation successively over the contact strips 27, 28 and 29. As soon as the contact 21, in the position shown, touches the contact strip 27, the voltage circuit of the relay is closed through the secondary of the potential transformer 2, contact 21 on the contact arm 19, contact piece 27 of the contact apparatus 18, fixed coils 12 of the relay with the parallel-connected capacity 15, and the choking coil 14. The contact arm 19 having moved so far that its contact 21, for instance, after a period of one second, leaves the contact strip 27 and thus touches the contact strip 28, a resistance 31 is connected in the voltage circuit and thus the force dependent on the voltage between the coils 5 and 12 is weakened. If, consequently, the force existing between the coils 4 and 11 and dependent on the current alone preponderates, the contact arm 7 bears against the contact 17. The release circuit is then closed; it runs from a battery 30 through the release coil 8, contacts 20, contact 17, contact arm 7 to the battery 30. After the lapse of a further second, the force dependent on the voltage is again weakened, since a further resistance 32 is cut in, as soon as the contact 21 slides from the contact strip 28 on to the contact strip 29.

When the release of the line switch 9 has not taken place within the time in which the contact 21 has moved forward from its normal position up to the end of the contact strip 29, then, as shown, the voltage circuit of the relay can finally be entirely interrupted at the contact 21 by the contact arm 19 moving beyond the contact strip 29. If another relay has previously disconnected the faulty line section, the overload has also been removed which fact is indicated by the overload relay 13 having released its armature 33, so that the release circuit is opened at the contacts 20, when the contact arm again reaches its normal contact 27. It is then again held thereon by the pawl 22.

In the other case, that is, when the overload in the line 1 energizes the electro-magnet and thus keeps the contact 22 in the release circuit of the line switch 9 closed, the contact arm 7 on the interruption of the voltage circuit of the relay is pressed on the contact 17, so that the line switch 9 is opened as soon as the third second has passed since the occurrence of the fault. The cutting out of very distant or incomplete short circuits, in which the potential is not very seriously reduced, can easily be further delayed by, for instance, lengthening the contact strip 29, so that the contact between this and the contact 21 is only interrupted later.

By means of the apparatus described, in which resistance in the voltage circuit is increased by degrees, the protective range of the relay is gradually extended until the short-circuit occurring on the line is reached by the relay. The apparatus disclosed herein is exceedingly sensitive. The contact arm 7 responds practically without any time lag to the changes in electrical conditions. Thus, if the torque due to the coils 4, 11 preponderates, the arm 7 will snap over to the position in which it engages the contact 17, and will be held firmly against said contact by such torque; but the instant that the oppositely directed torque due to the coils 5, 12 preponderates, the arm 7 will snap over to the other position, away from the contact 17 and into engagement with the stop 16, this being the normal position of the parts. The quick response of the rigidly connected parts 4, 5, 6, 7 is due largely to the fact that no damping device is connected with them, and is also materially assisted by the employment of the swinging coils 4, 5 which are very light and therefore have practically no mass inertia.

It is an advantage of the relay described that it may be used for extremely large current ranges. The sensitive and movable coils 4 and 5 need not carry any current proportional to the line current; they can be connected in series with a resistance which also increases with increasing current, for instance, a metal filament lamp or ballast resistor can be connected in series with these coils. The amplitude of the current flowing in the coils 4 and 5 is of no consequence since the torques produced in the coil systems 4, 11, or 5, 12, and opposed to each other are in exactly the same way, dependent on the current flowing in the coils 4, 5.

Furthermore, there is produced in the system of the coils 4, 11 a torque proportional to the square of the current, and having always the same direction, whereas in the system composed of the coils 5 and 12, a torque is produced in one or the other direction according to the phase condition of current and voltage; the relay is therefore sensitive to the energy direction. Normally, the torque produced by the coils 5, 12 preponderates, and thus no spring or other resistance-opposing device is required to throw the arm 7 to the open position; this again insures a very quick response of the parts 4, 5, 6, 7 when upon the occurrence of a short-circuit the torque due to the coils 4, 11 preponderates.

It is easily possible, to use instead of the gradually increased resistance in the voltage circuit a steady increase of this resistance.

I claim:

1. A device according to claim 21, in which both the means responsive to the line current and the means responsive to the line current and line voltage exert a torque on the movable circuit closer, but in opposite directions.

2. In combination with an electric line and an interrupter therefor, a circuit associated operatively with said interrupter and including a movable circuit-closer, an element mounted to turn and responsive exclusively to the current in said line, and another turning element connected with said first-mentioned element and responsive both to the current and to the voltage in said line, both of said elements being positively connected so that all three will be compelled to move simultaneously with said circuit-closer, and normally exerting torques in opposite directions, said elements being very light so as to have practically no mass inertia and adapted to bring the circuit-closer to the circuit-closing position when the resultant of the two torques is of the same direction as the torque produced by the element responsive exclusively to the current in the line, said two turning elements and the circuit-closer being undamped so that the latter will snap from the open to the closed position immediately upon the arising of a resultant equidirectional with the torque produced by the element responsive to current alone.

3. In combination with an electric line and an interrupter therefor, a circuit associated operatively with said interrupter and including a movable circuit-closer, a stationary and a pivoted coil co-operating with each other and both responsive exclusively to the current in said line, another stationary coil responsive to the voltage in said line, another pivoted coil coupled with the first-mentioned pivoted coil and responsive to the current in said line, said second pivoted coil co-operating with said second stationary coil, both of said pivoted coils being positively connected with said circuit-closer and normally exerting thereon torques in opposite directions, said pivoted coils being very light so as to have practically no mass inertia, and adapted to bring the circuit-closer to the circuit-closing position when the resultant of the two torques is of the same direction as the torque produced by the first-mentioned pivoted coil, said two pivoted coils and the circuit-closer being undamped so that the latter will snap from the open to the closed position immediately upon the arising of a resultant equi-directional with the torque produced by the first mentioned pivoted coil.

4. In combination with an electric line and an interrupter therefor, a circuit associated with said interrupter and including a movable circuit-closer, a coil system composed of a field coil excited by the line current exclusively and of a movable coil, another coil system composed of a field coil excited by the line voltage and of a movable coil, said movable coils being operatively connected with said circuit-closer, and being connected with each other electrically in series, a current-limiting resistance in series with said movable coils, another resistance connected to receive a current corresponding to the line current, connections from one end of said last-mentioned resistance to one terminal of one of the movable coils, and from the other end of said resistance to the opposite terminal of the other movable coil, said coil systems normally producing torques of opposite directions, and means for progressively reducing the excitation of the field coil excited by the voltage, the relation of the aforesaid parts being such that the interrupter will be brought to the open position only when the resultant of the torques produced by the two movable coils is of the same direction as the torque due to the coil system whose field coil is excited by the line current exclusively.

5. In combination with an electric line and a normally closed interrupter therefor, means, responsive exclusively to the current in said line, tending to bring the interrupter to the open position, other means, responsive both to the current and to the voltage in said line, normally acting in opposition to the said first-mentioned means, the relation of both of said means to the interrupter being such that the interrupter will be brought to the open position only when the resultant of the forces exerted by both of said means is of the same direction as the force exerted by said first-mentioned means, and time-controlled means for varying the ratio of the forces exerted respectively by said first-mentioned means and by said second-mentioned means.

6. A system comprising an electric line provided at different points with a plurality of normally closed interrupters, means, responsive exclusively to the current in said line, tending to bring the interrupters to the open position, other means, responsive both to the current and to the voltage in said line, normally acting in opposition to said first-mentioned means, the relation of both of said means to the interrupters being such that an interrupter will be brought to the open position only when the resultant of the forces exerted by both of said means is of the same direction as the force exerted by said first-mentioned means, time-controlled means associated with each interrupter, for varying the ratio of the forces exerted respectively by the means responsive exclusively to line current and by the means responsive both to line current and voltage, and means for starting said time-controlled means automatically when a short-circuit develops in the line, the running speed of said time-controlled means being so slow that the interrupter nearest the location of the defect will be actuated before the time-controlled means associated with the next following interrupter has reached the end of its travel.

7. In combination with an electric line and an interrupter therefor, a circuit associated operatively with said interrupter and including a movable circuit-closer, a pivoted coil responsive exclusively to the current in said line, another pivoted coil coupled with the first-mentioned coil and responsive both to the current and to the voltage in said line, both of said coils being operatively connected with said circuit-closer and normally exerting thereon torques in opposite directions, said coils being very light so as to have practically no mass inertia, and adapted to bring the circuit-closer to the circuit-closing position when the resultant of the two torques is of the same direction as the torque produced by the coil responsive exclusively to the line current, said two pivoted coils and the circuit-closer being undamped so that the latter will snap from the open to the closed position immediately upon the arising of a resultant equidirectional with the torque produced by the coil responsive to current alone.

8. In combination with an electric line and an interrupter therefor, a controlling circuit associated with said interrupter and including two gaps as well as a movable circuit-closer for one of said gaps, a coil system composed of a field coil excited by the line current and of a movable coil, another coil system composed of a field coil excited by the line voltage and of a movable coil, said movable coils being operatively connected with said circuit-closer, a variable resistance associated with the coil excited by the line voltage, time-controlled means for altering said resistance, a locking device for said time-controlled means, an electromagnet controlling said locking device and actuated by a short-circuit in the line, and a contact operatively connected with said locking device and arranged to bridge the other gap of said controlling circuit.

9. In combination with an electric line and an interrupter therefor, a controlling circuit associated with said interrupter and including a movable circuit-closer, means responsive exclusively to the current in said line and exerting a force tending to move said circuit-closer in one direction, and other means responsive both to the current and to the voltage in said line and normally exerting a force tending to move said circuit-closer in the opposite direction, each of said means including an element which is so light as to have practically no mass inertia, said two elements being positively connected with the circuit-closer so that all three will be compelled to move simultaneously, thus causing the circuit-closer to move in one direction or the other as soon as one of said forces preponderates over the other, said two means and the circuit-closer being undamped so that the latter will snap from the open to the closed position immediately when the resultant of said two forces is of the same direction with the force exerted by the means responsive exclusively to the current.

10. In combination with an electric line and an interrupter therefor, a circuit associated operatively with said interrupter and including a movable circuit-closer, means, responsive exclusively to the current in said line, exerting a torque on said circuit-closer and tending to move it in the direction which closes said circuit and thus operates said interrupter, other means, responsive both to the current and to the voltage in said line, exerting a torque on the circuit-closer in the opposite direction to the first-mentioned torque and tending to move the circuit-closer in the direction which opens said circuit, and time-controlled means for varying the ratio of the torques produced respectively by said first-mentioned means and by said second-mentioned means.

11. In combination with an electric line and an interrupter therefor, a circuit associated operatively with said interrupter and including a movable circuit-closer, an element mounted to turn and responsive exclusively to the current in said line, another turning element connected with said first-mentioned element and responsive both to the current and to the voltage in said line, both of said elements being positively connected with said circuit-closer so that all three will be compelled to move simultaneously, and normally exerting torques in opposite directions, said elements being adapted to bring the circuit-closer to the circuit-closing position when the resultant of the two torques is of the same direction as the torque produced by the element responsive exclusively to the current in the line, and means for varying progressively the ratio of the torques produced respectively by the said first-mentioned and by said second-mentioned elements.

12. In combination with an electric line and an interrupter therefor, a circuit associated operatively with said interrupter and including a movable circuit-closer, an element mounted to turn and responsive exclusively to the current in said line, another turning element connected with said first-mentioned element and responsive both to the current and to the voltage in said line, both of said elements being positively connected with said circuit-closer so that all three will be compelled to move simultaneously, and normally exerting torques in opposite directions, said elements being adapted to bring the circuit-closer to the circuit-closing position when the resultant of the two torques is of the same direction as the torque produced by the element responsive exclusively to the current in the line, and time-controlled means for increasing stepwise, in predetermined time intervals, the ratio of the torque exerted by the element responsive exclusively to the line current, to the torque exerted by the element responsive both to the current and to the voltage in the line.

13. In combination with an electric line and an interrupter therefor, a circuit associated operatively with said interrupter and including a movable circuit-closer, means, responsive exclusively to the current in said line, tending to move said circuit-closer in the direction which closes the said circuit and thus operates the said interrupter, other means, responsive both to the current and to the voltage in said line, tending to move said circuit-closer in the direction which opens the said circuit, the relation of both of said means to said circuit-closer, being such that said circuit will be closed only when the resultant of the forces exerted by both of said means is of the same direction as the force exerted by said first-mentioned means, both the means responsive to the line current and the means responsive to the line current and line voltage exerting a torque on the movable circuit-closer, but in opposite directions, and a time-controlled means for increasing stepwise, in predetermined time intervals, the ratio of the torque exerted by the element responsive exclusively to the line current, to the torque exerted by the element responsive both to the current and to the voltage in the line.

14. In combination with an electric line and an interrupter therefor, a circuit associated operatively with said interrupter and including a movable circuit-closer, a stationary and a pivoted coil co-operating with each other and both responsive exclusively to the current in said line, another stationary coil responsive to the voltage in said line, another pivoted coil coupled with the first-mentioned pivoted coil and responsive to the current in said line, said second pivoted coil co-operating with said second stationary coil, both of said pivoted coils being positively connected with said circuit-closer and normally exerting thereon torques in opposite directions, said pivoted coils being adapted to bring the circuit-closer to the circuit-closing position when the resultant of the two torques is of the same direction as the torque produced by the first-mentioned pivoted coil, a variable resistance associated with the coil responsive to the line voltage, to vary the excitation of said coil, and a time-controlled means for altering said resistance and thereby increasing the ratio of the torque exerted by the first-mentioned pivoted coil, to the torque exerted by the second-mentioned pivoted coil.

15. In combination with an electric line and an interrupter therefor, a circuit associated operatively with said interrupter and including a movable circuit-closer, a stationary and a pivoted coil co-operating with each other and both responsive exclusively to the current in said line, another stationary coil responsive to the voltage in said line, another pivoted coil coupled with the first-mentioned pivoted coil and responsive to the current in said line, said second pivoted coil co-operating with said second stationary coil, both of said pivoted coils being positively connected with said circuit-closer and normally exerting thereon torques in opposite directions, said pivoted coils being adapted to bring the circuit-closer to the circuit-closing position when the resultant of the two torques is of the same direction as the torque produced by the first-mentioned pivoted coil, a variable resistance associated with the coil responsive to the line voltage, to vary the excitation of said coil, a time-controlled means for altering said resistance and thereby increasing the ratio of the torque exerted by the first-mentioned pivoted coil, to the torque exerted by the second-mentioned pivoted coil, a locking element for normally preventing movement of said time-controlled means, and a device for releasing said locking element automatically when a short-circuit develops in the line.

16. In combination with an electric line and an interrupter therefor, a circuit associated operatively with said interrupter and including a movable circuit-closer, a stationary and a pivoted coil co-operating with each other and both responsive exclusively to the current in said line, another stationary coil responsive to the voltage in said line, another pivoted coil coupled with the first-mentioned pivoted coil and responsive to the current in said line, said second pivoted coil co-operating with said second stationary coil, both of said pivoted coils being positively connected with said circuit-closer and normally exerting thereon torques in opposite directions, said pivoted coils being adapted to bring the circuit-closer to the circuit-closing position when the resultant of the two torques is of the same direction as the torque produced by the first-mentioned pivoted coil, a variable resistance associated with the coil responsive to the line voltage, to vary the excitation of said coil, a time-controlled means for altering said resistance and thereby increasing the ratio of the torque exerted by the first-mentioned pivoted coil, to the torque exerted by the second-mentioned pivoted coil, and means for starting said time-controlled means automatically when a short-circuit develops in the line.

17. In combination with an electric line and an interrupter therefor, a controlling circuit associated with said interrupter and including a movable circuit-closer, means responsive exclusively to the current in said line and exerting a force tending to move said circuit-closer in the direction to close the circuit, and other means responsive both to the current and to the voltage in said line and normally exerting on the circuit-closer, in the direction opposite to the first-mentioned means, a force greater than that exerted by the first-mentioned means, so as to normally hold the circuit-closer in the circuit opening position, but to cause the circuit-closer to move to the circuit-closing position as soon as the resultant of the forces exerted by said two means is of the same direction as the force exerted by the first-mentioned means, each of said means including a movable element which is so light as to have practically no mass inertia.

18. In combination with an electric line and a normally closed interrupter therefor, means, responsive exclusively to the current in said line, tending to bring the interrupter to the open position, and other means, responsive both to the current and to the voltage in said line, normally acting in opposition to said first-mentioned means with such force as to overcome the action thereof, and tending to bring the interrupter to the closed position, each of said means including a movable element which is so light as to have practically no mass inertia.

19. In an electric circuit protecting system, the combination with a circuit to be protected of a distance relay including two counteracting sets of coils, a shunt, means for feeding said shunt and a coil of each of said sets with current proportional to one of the phase currents of said circuit, a circuit-breaker mounted in said circuit, a time relay including means actuated thereby for connecting progressively increasing portions of said shunt across a coil of one of said sets not fed by said first mentioned means, whereby said distance relay is operated after a time increasing as a function of the distance from the fault of said distance relay, means controlled by said distance relay for actuating said circuit-breaker, and means responsive to the occurrence of a fault in said circuit for bringing said time relay into operation.

20. In an electric protecting system, the combination, with a circuit to be protected, of a distance relay including two counteracting sets of coils, means for feeding a coil of each of said sets with a current proportional to one of the phase currents of said circuit, a circuit-breaker mounted in said circuit, a time relay, means controlled by said time relay for feeding progressively varying current to a coil of one of said sets, not fed by said first mentioned means, whereby said distance relay is operated after a time increasing with the distance from the fault of said distance relay, means controlled by said distance relay for actuating said circuit-breaker, and means responsive to the occurrence of a fault in said circuit for bringing said time relay into operation.

21. In combination with an electric line and an interrupter therefor, a circuit associated operatively with said interrupter and including a movable circuit-closer, means, responsive exclusively to the current in said line, tending to move said circuit-closer in the direction which closes the said circuit and thus operates the said interrupter, and other means, responsive both to the current and to the voltage in said line, tending to move said circuit-closer in the direction which opens the said circuit, each of the said means which tend to move said circuit-closer including a movable element which is so light as to have practically no mass inertia, the relation of both of said means to said circuit closer, being such that said circuit will be closed only when the resultant of the forces exerted by both of said means is of the same direction as the force exerted by said first-mentioned means, both of said elements being connected positively with the circuit closer so that all three will be compelled to move simultaneously, said circuit-closer being undamped so as to snap from the open to the closed position immediately upon the arising of a resultant equidirectional with the effect of the means responsive to current alone.

22. In combination with an electric line and an interrupter therefor, a circuit associated operatively with said interrupter and including a movable circuit closer, means, responsive exclusively to the current in said line, tending to move said circuit closer in the direction which closes the said circuit and thus operates the said interrupter, and other means, responsive both to the current and to the voltage in said line, tending to move said circuit closer in the direction which opens the said circuit, whereby said circuit will be closed only when the force exerted by said first-mentioned means is greater than that exerted by said second mentioned means, each of the said means which tend to move said circuit-closer including a movable element which is so light as to have practically no mass inertia, both of said elements being connected positively with the circuit closer so that all three will be compelled to move simultaneously, said circuit-closer being undamped so as to snap from the open to the closed position immediately upon the arising of a resultant equidirectional with the effect of the means responsive to current alone.

23. In combination with an electric line and an interrupter therefor, a controlling circuit associated with said interrupter and including a movable circuit-closer, two dynamometric means each including a movable element operatively connected with said circuit-closer, such elements being so light as to have practically no mass inertia, electrical devices and connections for causing one of said elements to respond exclusively to current in said line, and electrical devices and connections for causing the other of said elements to respond both to the current and to the voltage in said line.

24. In combination with an electric line and an interrupter therefor, a controlling circuit associated with said interrupter and including a movable circuit-closer, means responsive exclusively to the current in said line and exerting a force tending to move said circuit-closer in one direction, means responsive both to the current and to the voltage in said line and exerting a force tending to move said circuit-closer in the opposite direction, and time-controlled means for varying the ratio of the force exerted by said first-mentioned means, to the force exerted by said second-mentioned means.

25. In combination with an electric line and an interrupter therefor, a controlling circuit associated with said interrupter and including a movable circuit-closer, ironless means responsive exclusively to the current in said line and exerting a force tending to move said circuit-closer in one direction, and additional ironless means responsive both to the current and to the voltage in said line and tending to move said circuit-closer in the opposite direction.

26. In combination with an electric line and an interrupter therefor, a controlling circuit associated with said interrupter and including a movable circuit-closer, means responsive exclusively to the current in said line and exerting a force tending to move said circuit-closer in one direction, means responsive both to the current and to the voltage in said line and exerting a force tending to move said circuit-closer in the opposite direction, each of said means including a movable coil operatively connected with said circuit-closer and a stationary coil, and a resistance in the circuit of said first-mentioned means, the movable coil of said first-mentioned means being in shunt relation to said resistance.

27. In an electric protecting system, the combination, with a circuit to be protected, of a distance relay including two counteracting sets of coils, the coils of one set being responsive exclusively to the current in said circuit, while the other set is responsive both to current and to voltage in said circuit, a circuit-breaker mounted in said circuit, a time relay, means controlled by said time relay for progressively varying the ratio between the forces exerted by the said sets of coils, to cause said distance relay to be operated after a time increasing with the distance from the fault of said distance relay, means controlled by said distance relay for actuating said circuit-breaker, and means responsive to the occurrence of a fault in said circuit for bringing said time relay into operation.

HANS POLECK.